United States Patent [19]

Shandy et al.

[11] 4,389,271
[45] Jun. 21, 1983

[54] METHOD FOR MAKING MOLDED ARTICLES

[75] Inventors: Walter V. Shandy, Chester; Jospeh M. Voytilla, Pottstown, both of Pa.

[73] Assignee: The West Company, Phoenixville, Pa.

[21] Appl. No.: 354,059

[22] Filed: Mar. 2, 1982

Related U.S. Application Data

[63] Continuation of Ser. No. 155,671, Jun. 5, 1980, abandoned, which is a continuation of Ser. No. 969,237, Dec. 13, 1978, abandoned, which is a continuation of Ser. No. 753,785, Dec. 23, 1976, abandoned.

[51] Int. Cl.³ .......................... B29C 7/00; B29H 3/00; B32B 25/00
[52] U.S. Cl. .................................... 156/242; 156/245; 156/250; 156/252; 156/257; 156/261; 156/262; 428/332; 428/420; 428/465

[58] Field of Search ................... 156/184, 242, 244.11, 156/250, 245, 252, 257, 261, 262, 268, 293, 308, 528, 538; 264/45.1, 45.8, 45.9, 46.1, 46.7, 46.9, 175, 241, 263, 268, 269, 321, 337, 338, DIG. 59; 215/364, DIG. 3; 428/332, 420, 465; 128/218, DIG. 14

[56] References Cited

U.S. PATENT DOCUMENTS 2,548,305  4/1951  Gora .................................. 156/242
3,484,337 12/1969  Starita ............................... 428/420

Primary Examiner—Caleb Weston
Attorney, Agent, or Firm—Eugene E. Renz, Jr.

[57] ABSTRACT

A method and system for making molded articles including a disc from a laminated sheet comprising a layer of elastomeric material and a layer of inert material consisting of the steps of partially cutting at least one disc from sheet material, positioning the sheet over a transfer plate with the partially cut disc in registry with an opening in the transfer plate, severing the disc from the sheet to the opening in the transfer plate, positioning the transfer plate over a mold having at least one cavity therein and transferring the disc from the transfer plate to the bottom of the mold cavity.

2 Claims, 14 Drawing Figures

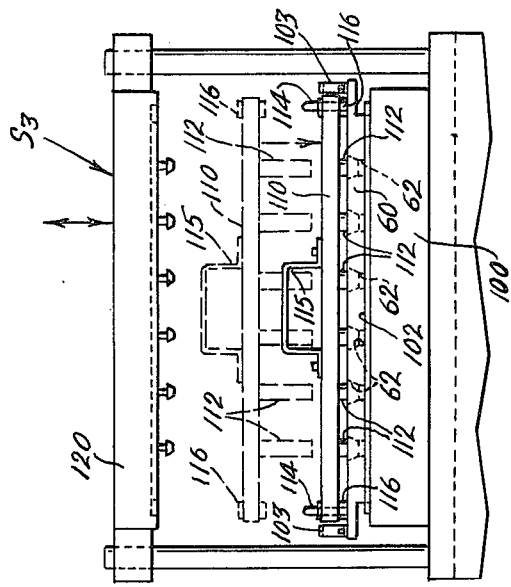
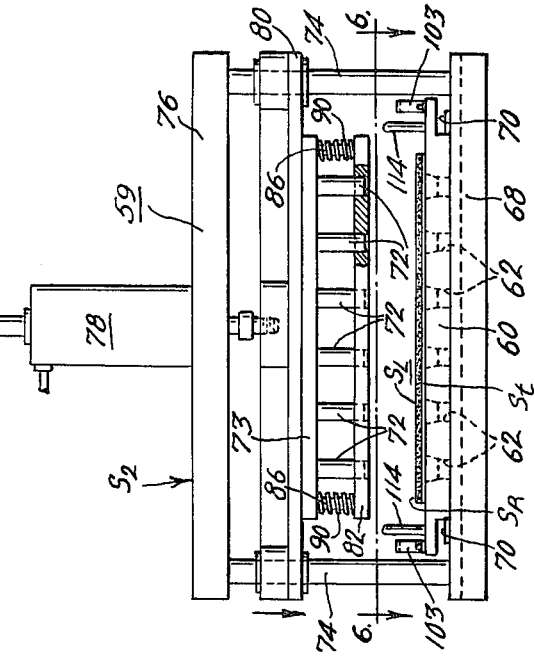
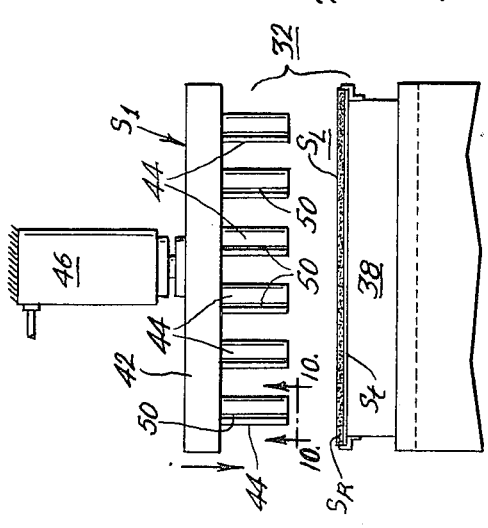
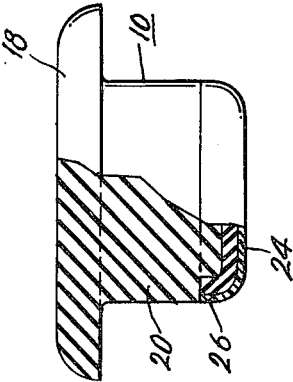

METHOD FOR MAKING MOLDED ARTICLES

The present application is a continuation of our prior application Ser. No. 155,671 filed June 5, 1980 entitled METHOD AND SYSTEM FOR MAKING MOLDED ARTICLES now abandoned, which in turn is a continuation of our prior application Ser. No. 969,237 filed Dec. 13, 1978 now abandoned, which in turn is a continuation of our prior application Ser. No. 753,785 filed Dec. 23, 1976, also now abandonded.

BACKGROUND OF THE INVENTION

1. Field of the Invention

The present invention relates to a method and system of making molded articles comprised of elastomeric material such as rubber having a liner or facing of an inert material, such as Teflon.* More specifically, the invention relates to a method and system for molding articles such as plungers used in syringe assemblies or stoppers used in bottles for medicaments and the like. These plungers and stoppers are conventionally made of a resilient material such as rubber. However, in order to provide a barrier between the contents of a syringe or medicament container and the rubber body portion of the plunger or stopper, the plunger or stopper are provided with a liner or facing of an inert material, such as Teflon, defining a barrier between the rubber of the plunger or stopper and container contents. The present invention provides improved method and system for making these items with such an inert liner.

*a trademark for tetraflourethylene polymer of E. I. DuPont de Nemours

2. Prior Art

A method and system for making articles and articles of the above type are disclosed in applications, Ser. No. 743,006, filed Nov. 18, 1976, entitled METHOD AND SYSTEM FOR MAKING MOLDED ARTICLES AND ARTICLES PRODUCED THEREBY, and Ser. No. 742,746, filed Nov. 18, 1976, entitled A METHOD FOR MAKING MOLDED ARTICLES, assigned to a common assignee of the present application. In accordance with the method disclosed therein, an elastomeric material such as rubber is produced in sheet form and laminated to a sheet of inert material such as Teflon at a supply and sheet forming station. A plurality of discs are then punched from the laminated sheet and temporarily seated or positioned in a loading rack having a series of circular through openings therein. The loading rack is a flat, generally rectangular tray having a plurality of circular openings corresponding in number and orientation to the cavities in the mold for forming the finished article. The openings are of a diameter slightly smaller than that of the discs to retain the discs in the loading rack during a transfer operation to the molding station.

Filled loading racks are transferred and superimposed over the lower mold for the article and means in the form of a series of discharge pins or rods mounted on a reciprocating platen transfers the clad discs from the loading rack and positions them in the bottom of each of the mold cavities. Thereafter, the mold cavities are charged with additional quantities of elastomeric material and the finished product is formed by conventional molding procedures.

Even though this prior method and system have been effective in producing generally suitable products, the formation and handling of the discs in the manner described above are somewhat awkward and the process is relatively time consuming and not generally suited to mass production techniques. More specifically, the prior sheet forming and loading station shown in the above-identified pending applications includes a die having a series of through openings, an upper platen having a series of punch rods in number and orientation conforming to the openings in the die and a lower platen below the die having a plurality of pins in number and orientation equal to those in the die. In the punching operation the sheet to be punched is placed on the upper face of the die and the upper platen actuated to completely sever the discs and position them in the die openings. Thereafter, a loading rack is superimposed over the top of the die and the pins in the lower platen actuated to push the discs into the loading rack. The upper and lower platens are suitably synchronized to perform the operations described in a predetermined timed sequence. Some difficulties, however, have been encountered by reason of the specific manner in which the discs are cut and transferred. For example, it has been observed that if the platens are out of phase, which occurs occasionally, the sheet is only partially engaged and is therefore defective. Even if the platens are functioning properly, in some instances, the discs assume a cocked position in the loading rack and accordingly, when the rack is transferred to the mold station, some of the discs may fall out, requiring manual replacement or even if eccentrically aligned, discs are retained, they will not be properly positioned in the mold cavity and this, of course, produces an unacceptable finished product. In summary, the problems of improper or partial cycling of the platens creates either waste of laminated sheet material or defective products and, in short, limits the mass production capability of the entire system.

Accordingly, it is an object of the present invention to provide a system and apparatus which expedites the formation and handling of the clad discs in a manner which greatly simplifies the initial forming operation and produces more accuracy and reliability in precisely positioning the discs in the mold cavities. It has been observed that the improved system also effectively eliminates the problem of cocked or eccentrically loaded discs in the transfer plate or rack. The new system also eliminates the need for manual retrieval of discs jarred from the transfer rack which of course, is time consuming. The method and system of the present invention minimize waste of laminated sheet material, reduces the rejection rate of finished product and is truly a mass production process.

SUMMARY OF THE INVENTION

Essentially the method and system of the present invention consists in a disc forming station comprising a punch and die mechanism which partially severs the discs from the sheet material. The sheet with the partially severed discs is then superimposed over a transfer plate and, by reason of the slight protrusion of the partially severed discs from one face of the sheet material, the sheet self orients and insures registry of the discs with the openings in the transfer plate. The transfer plate is positioned on the bottom press plate and a top platen having a plurality of pins corresponding with the openings in the transfer plate is actuated downward, severing the discs from the sheet and positioning them in the transfer plate. The transfer plate is then positioned over the lower mold plate and a manually actuatable push plate presses the discs from the transfer plate and accurately positions them in the bottom of the mold cavity.

BRIEF DESCRIPTION OF THE FIGURES

FIG. 1 is a side elevational view partly in section of a stopper made by the method and system of the present invention;

FIG. 2 is a side elevational view partly in section of a syringe assembly incorporating a plunger made in accordance with the present invention;

FIGS. 3, 4 and 5 are schematic views of the disc forming station, disc severing and transfer station and mold loading and molding stations respectively;

DETAILED DESCRIPTION OF THE PREFERRED METHOD AND SYSTEM

Figure 6:
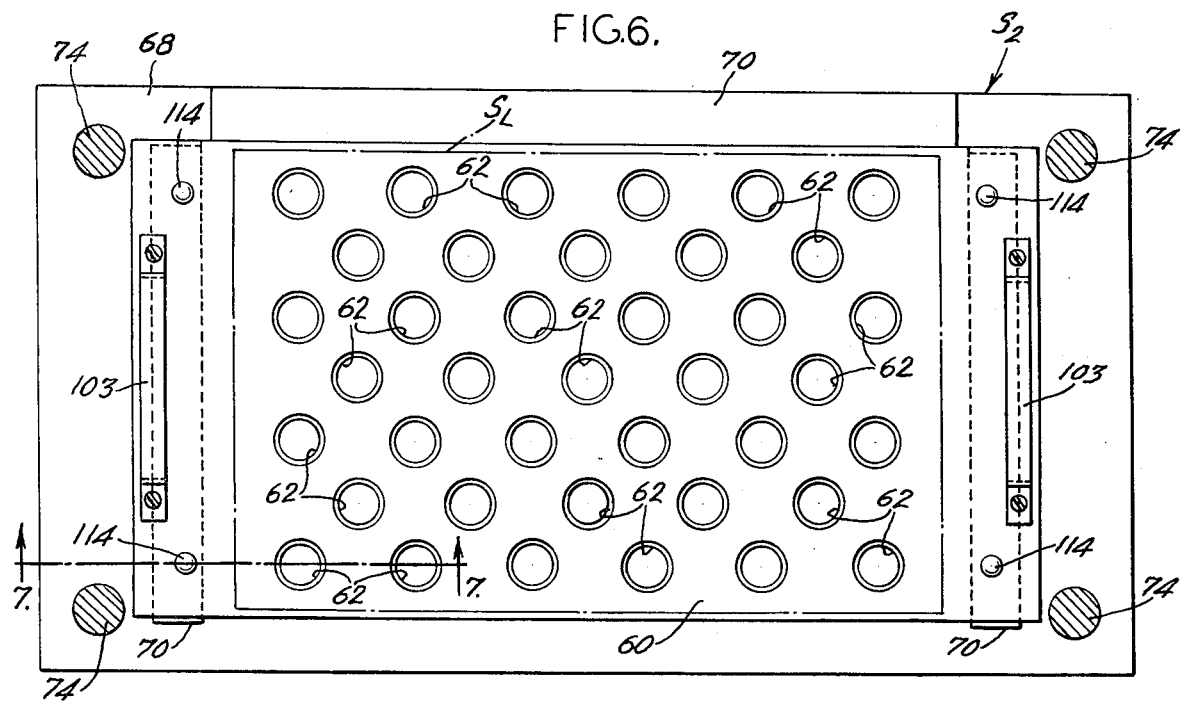
FIG. 6 is an enlarged plan view of the transfer plate and base of loading press assembly taken on line 6—6 of FIG. 4.

Referring now to the drawings and particularly to FIGS. 1 and 2 thereof, there are illustrated typical articles made in accordance with the method and system of the present invention. FIG. 1 illustrates the stopper type closure 10 for containers or bottles and FIG. 2 shows a plunger 12 for a syringe assembly 14. The stopper 10 comprises a body portion 18 made of rubber having a depending plug portion 20 which snugly fits in the opening of the container and a liner or facing 24 made of an inert material such as Teflon providing an inert barrier between the container contents and the rubber. The liner 24 covers the bottom face of the plug portion 20 and has a circumferentially extending return flange 26. The plunger, likewise, has a body portion 28 made of rubber and a Teflon liner 30 at its inner axial end. Since some medicaments tend to react chemically with rubber, the Teflon facing provides a barrier between the rubber and the container or syringe contents preventing immigration of the medicament, thus preserving the therapeutic value of the medicaments and extending their useful shelf life.

The effectiveness of the Teflon barrier in these articles is to a large extent dependent on accurate positioning of the clad disc in the mold cavity. The present invention provides a method and system to accomplish this goal in a manner compatible with mass production techniques. The method consists essentially of laminating uncured rubber stock in sheet form $S_R$ to a layer of Teflon sheet material $S_t$ and thereafter partially severing discs from the laminated sheet $S_L$ at a disc forming station $S_1$ (FIG. 3). The sheet is then positioned over a transfer plate at a transfer station $S_2$ (See FIG. 4) with the discs aligned with the cavities therein. A loading press then severs the discs D and positions them in the transfer plate. The selvage is removed, the transfer plate positioned over the lower mold at a disc loading and final molding station $S_3$ (FIG. 5), and the discs ejected to the mold cavities by a manually actuatable push plate. The mold cavity is then charged with additional quantities of elastomeric material and by conventional molding techniques the finished product is formed.

The laminated sheet $S_L$ may comprise a layer of elastomeric material $S_R$ such as rubber of a cross sectional thickness in the range of about 0.030 in. to 0.110 in. and a layer of an inert material $S_t$ such as Teflon of between about 0.002 and 0.003 inches in thickness. As illustrated and described in the previously mentioned Allen et al applications, the laminated sheet $S_L$ may be formed in a conventional manner on a standard three roll calendar.

Figures 9, 11, 13:
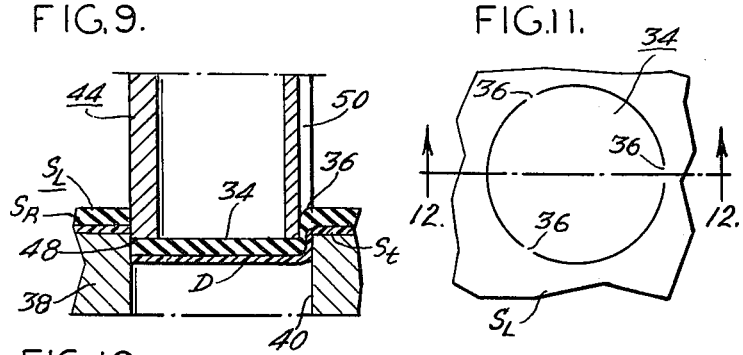
FIG. 9 is an enlarged side elevational view partly in section of the disc forming punch and die.
FIG. 11 is a fragmentary plan view of a disc partly cut from the laminated sheet.
FIG. 13 is a perspective view of the terminal end of the punching die.
Figure 10:
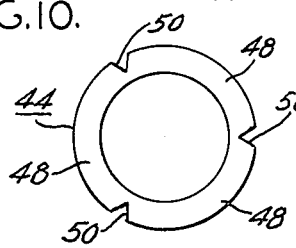
FIG. 10 is an enlarged bottom plan view of the disc cutting die taken on lines 10—10 of FIG. 3.
Figure 12:
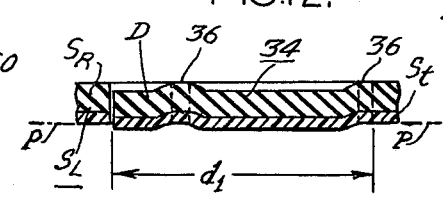
FIG. 12 is an enlarged sectional view taken on line 12—12 of FIG. 11.
Figure 14:
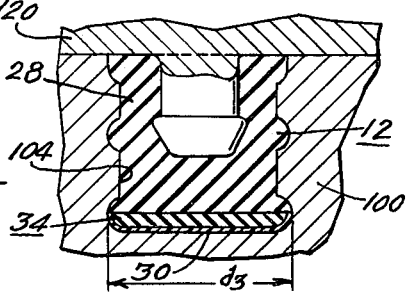
FIG. 14 is a sectional view showing a fragment of the upper and lower mold elements.

With the above general description of the method and system in mind, the details of the improved method and system will now be described. Considering first the partial cutting operation at the disc forming station $S_1$, (FIG. 3), a punch and die mechanism generally designated by the numeral 32 produces a plurality of partially cut discs 34 in the laminated sheet $S_L$. A fragment of this sheet is illustrated in FIG. 11 and as shown, the circular discs 34 are completely severed from the selvage, except at bridge connections 36 located in the present instance at three circumferentially equispaced locations. The apparatus for so forming the sheet is illustrated schematically in FIG. 3 and comprises an anvil 38 having through holes 40 of circular cross section extending through the anvil, and a platen 42 mounting a plurality of punch dies 44. The platen 42 is adapted for reciprocating movement by means of a piston-cylinder actuator 46 between an upper limit position wherein the cutting faces of the punch dies 44 are spaced above the laminated sheet $S_L$ and a lower limit position engaging in the holes 40 to cut the discs, except at the bridge connections 36. (FIG. 11). To this end, the free terminal end of each of the punch dies 44 is provided with three arcuate cutting edges 48 which are circumferentially spaced by an axially extending gap 50 (See FIGS. 10 and 13). In the present instance, the gaps 50 are grooves of V-shaped cross section which extend axially the full length of the punch dies 44 as illustrated. By this arrangement, when the punch dies are actuated to engage the sheet $S_L$, partially severed discs D are formed having three severable connecting bridges 36 as shown in FIGS. 11 and 12. The penetration of the punch dies to achieve this partial cutting action is controlled in a conventional manner through the piston-cylinder actuator 46. It has been found that a slight penetration of about 1/32 in. of the tip of the punch die into the hole 40 of the anvil 38 yields the desired cutting action to form the bridges 36 as well as displace the partially severed disc below the plane P—P of the sheet $S_L$ for easier orientation at the transfer station $S_2$.

Even though the method and system are set forth and described herein in connection with a laminated sheet $S_L$ comprising a layer of rubber $S_R$ and a layer of Teflon $S_T$, the method and system have useful application to other type laminates as well as simply sheet material used in molding processes.

Furthermore, while a specific means has been described in connection with the partial cutting at the disc forming station $S_1$, other means for partially severing the discs may be employed. For example, the punch dies 44 may have a continuous circumferentially extending depending cutting edge which completely penetrates the rubber layer $S_R$ and partially scores the Teflon layer $S_T$ at the interface between the rubber and Teflon to form a partial score therein and a continuous severable bridge connection. Additionally, it is noted that while the discs are circular, the method and system apply to formation of discs of various shapes suited to the type of product being molded.

Figure 7:
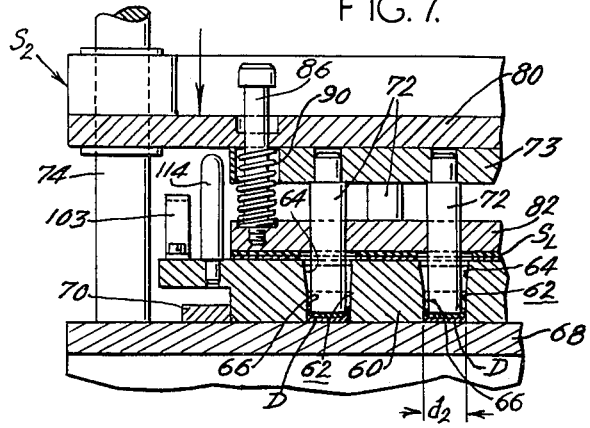
FIG. 7 is a fragmentary sectional view taken on line 7—7 of FIG. 6 showing the middle platen of the loading press assembly in a down position.
Figure 8:
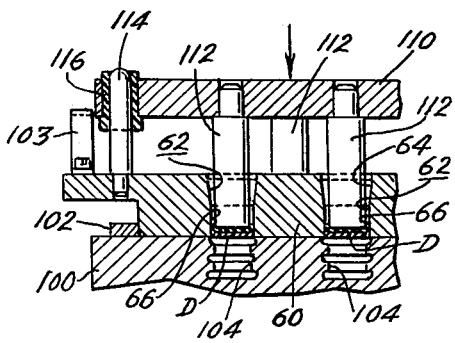
FIG. 8 is a fragmentary sectional view of the mold loading apparatus.

The laminated sheet $S_L$ with the partially cut discs is transferred from the cutting station $S_1$ to a loading press assembly 59 and superimposed over the top face of a transfer plate 60 at the disc removal and transfer station $S_2$ (See FIG. 4). The transfer plate is a flat, generally rectangular member having a plurality of openings 62 arranged in rows and corresponding in number and orientation to the disc formation in the laminated sheet $S_L$. These openings as shown in FIGS. 7 and 8 have a downwardly convergent frusto-conical pilot section 64 and a cylindrical extension 66. The tapered portion of the opening 62 initially helps to locate the sheet in proper position over the openings in the transfer plate and serves as a pilot when the discs are separated. The pilot sections aids in initial orientation of the sheet on the transfer plate, the mouth of the pilot section being of a diameter slightly greater than the diameter of the disc so that the discs which depend slightly from the face of the sheet easily seat therein. This provides a self centering feature. Further, the slight taper curls the edge of the disc upwardly as it is displaced into the cylindrical extension 60 of the openings in the transfer plate and thus, preliminarily conditions the discs to form the return flange 26 in the finished product.

The diameter $d_1$ of the discs is preferably greater than the diameter $d_2$ of the cylindrical extension 66 of the opening of the transfer plate to support the discs therein by a friction fit. The disc diameter $d_1$ is also greater than the diameter $d_3$ of the bottom of the mold cavity so that when the disc is positioned therein, the circumferential outer edge is turned upwardly to form the return flange in the molded product. It has been found that the above results can be achieved when the disc diameter $d_1$ is of a dimension between 0.035 and 0.040 ins. greater than the diameter $d_2$ of the cylindrical extension 66.

The transfer plate rests on the bottom press plate 68 which has suitable guides 70 for aligning the transfer plate with the push pins 72 of the press push plate 73. The press push plate 73 is attached and depends from a middle platen 80 mounted for reciprocating up and down movement on four guide posts 74, which extend between the bottom press plate 68 and a top support 76. A piston cylinder actuator 78 coupled at the rod end to the middle platen 80 actuates the disc stripping and transfer assembly between the raised position shown in FIG. 4 and the lowered position shown in FIG. 7 and during cycling thereof, push pins 72 strip the discs from the laminated sheet $S_L$ and position them in the bottom portion of the opening 62 in the transfer plate 60. The press plate assembly further includes a stripper plate 82 supported in stripper bolts 86 in the middle platen 80, coil springs 90 circumscribing each one of the bolts 86 to normally maintain the stripper plate 82 in a lowered position. However, during actuation of the press push plate 73, the stripper plate 82 is moved upwardly relative to the bolts 86 against the bias of the springs 90 and when the press push plate is withdrawn after a stripping cycle, the stripper plate 82 insures that the selvage does not adhere to the push pins 72 so that it can be readily removed and discarded from the top face of the transfer plate.

After filling the transfer plate with the clad discs in the manner described above, the filled transfer plate 60 is removed from the transfer station $S_2$ and positioned on the upper face of the lower mold 100 at the product molding station $S_3$. The lower mold 100 is provided with a rectangular guide frame 102, the inner periphery of which conforms closely to the outer periphery of the transfer plate 60 so that the transfer plate 60 may be supported over the top of the mold cavity whereby the openings 62 therein are concentrically aligned in registry with the lower mold cavities 104 (See FIGS. 5 and 8). The transfer plate is provided with handles 103 at opposite ends to facilitate manual removal of the transfer plate from the forming station $S_2$ and positioning thereof in the molding station in the manner described above.

With the transfer plate in the position shown in FIG. 5, a push plate 110 having a plurality of push pins 112 equal in number to the openings in the transfer plate and oriented to engage therein is manually positioned over the transfer plate as illustrated in FIG. 5. It is then moved manually downwardly whereby the free axial end face of the push pins 112 engage the clad discs (See FIG. 8) displace and position them accurately in the lower portion of the mold cavities 104. In order to guide the push plate 110 the transfer plate 60 carries upstanding locating pins 114 and the manual push plate has bushings 116 which align with the locating pins 114 when the push plate 110 has been moved to its disc engaging position, as illustrated in FIG. 8. Locating pins 114 enter bushings 116 before push pins 112 enter openings 62 in transfer plate 60 to align push plate 110 and transfer plate 60. To facilitate manual positioning and actuation of the push plate 110, it is provided with handles 115 at opposite ends. Of course, the upper mold 120 is in a raised position during the disc transfer operation. After this operation is completed, the push plate 110 and the transfer plate 60 are removed from the upper face of the lower mold 100. The cavities are then charged with an additional quantity of elastomeric material and the upper mold 120 is actuated to a closed position. The final processing of the stopper or plunger product is completed by conventional techniques including application of heat and pressure to mold the finished product.

The terms "bridges", "bridge connections" or "connecting bridges" as used herein shall include the discrete connecting areas identified by the numeral 36 in the drawings, as well as a disc formed by a continuous partial scoring technique discussed above. The term "partial cutting" shall be interpreted broadly enough to cover discs formed by a continuous partial scoring technique.

While preferred embodiments of the present invention have been described in detail, various modifications, alterations and changes may be made without departing from the spirit and scope of the present invention as defined in the appended claims.

We claim:
1. A method for making molded articles including a disc from a laminated sheet comprising a layer of elastomeric material and a layer of inert material consisting of the steps of partially cutting at least one disc from the sheet material, positioning the sheet over a transfer plate with the partially cut disc in registry with an opening in the transfer plate, positioning the transfer plate over a mold having at least one cavity therein with the openings of the transfer plate in registry with the cavities, completely severing the disc from the sheet material and transferring the severed disc through the opening in the transfer plate to the bottom of the mold cavity, charging the mold cavity with additional quantities of elastomeric material and curing the elastomeric materials.

2. A method as claimed in claim 1 wherein the partial cutting consists of severing the entire thickness of the sheet material at a plurality of circumferentially spaced locations leaving bridges connecting the discs to the sheet between said locations.

* * * * *